Figure 1:
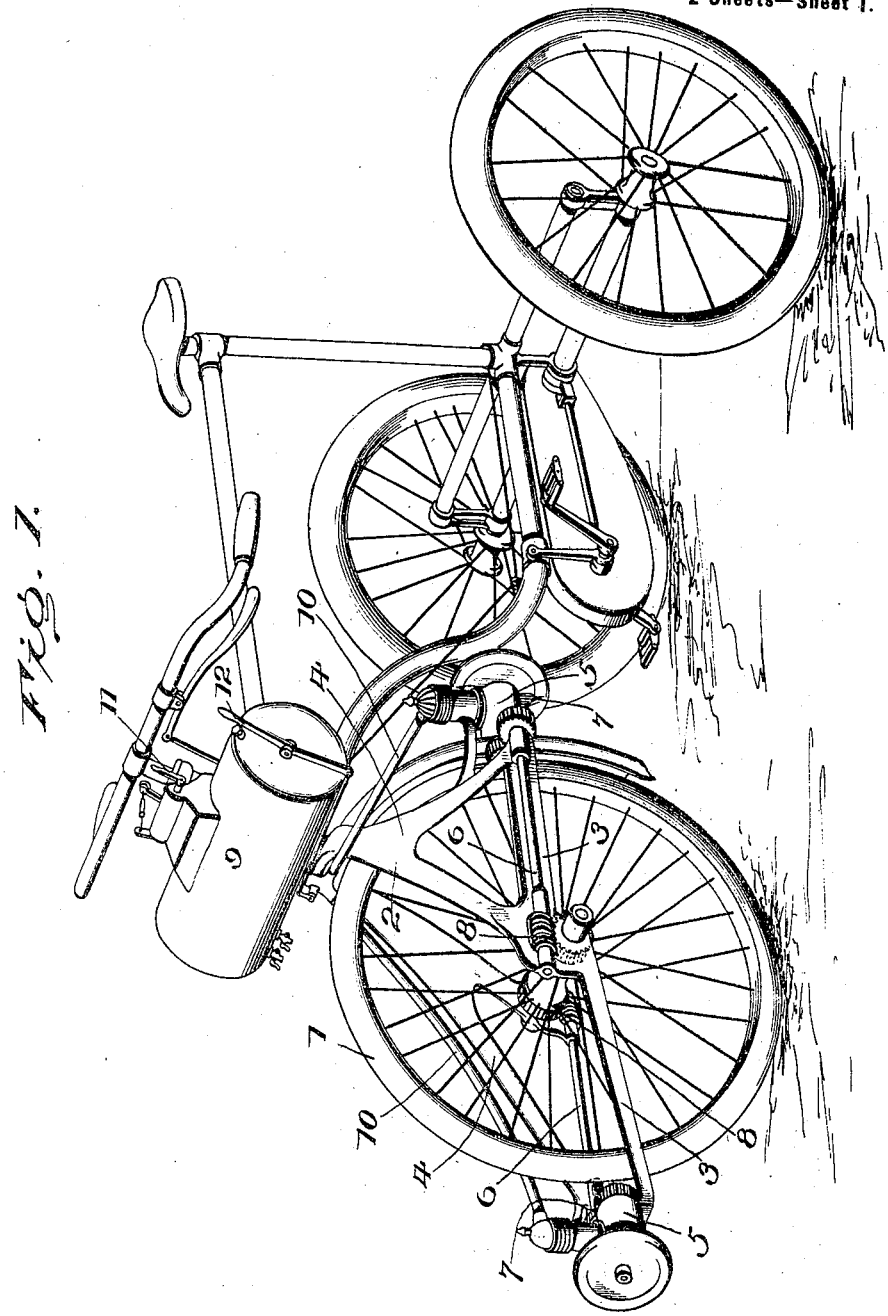

No. 670,179.  
H. J. LAWSON.  
MOTOR DRIVING MECHANISM.  
(Application filed Nov. 7, 1900.)  
Patented Mar. 19, 1901.

(No Model.)

2 Sheets—Sheet 1.

Witnesses  
Inventor  
Henry J. Lawson  
By Knight Bros  
Attorneys

No. 670,179. Patented Mar. 19, 1901.
H. J. LAWSON.
MOTOR DRIVING MECHANISM.
(Application filed Nov. 7, 1900.)
(No Model.) 2 Sheets—Sheet 2.
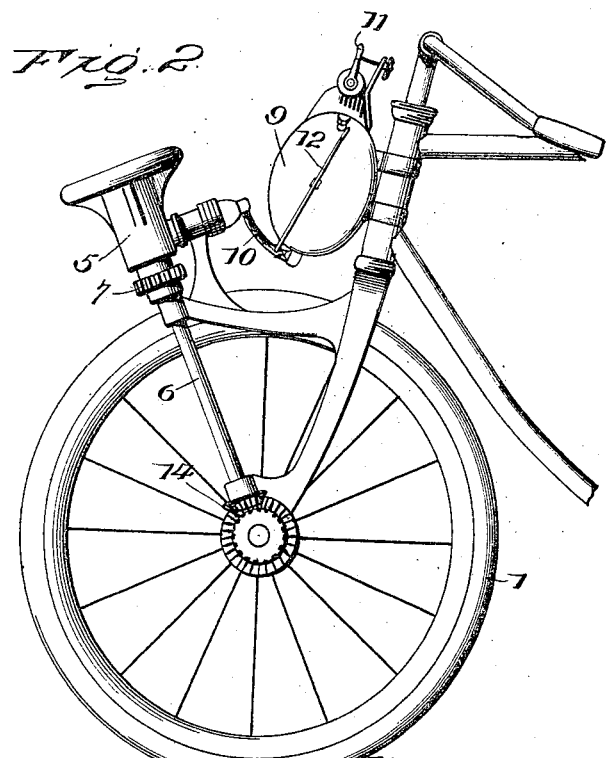
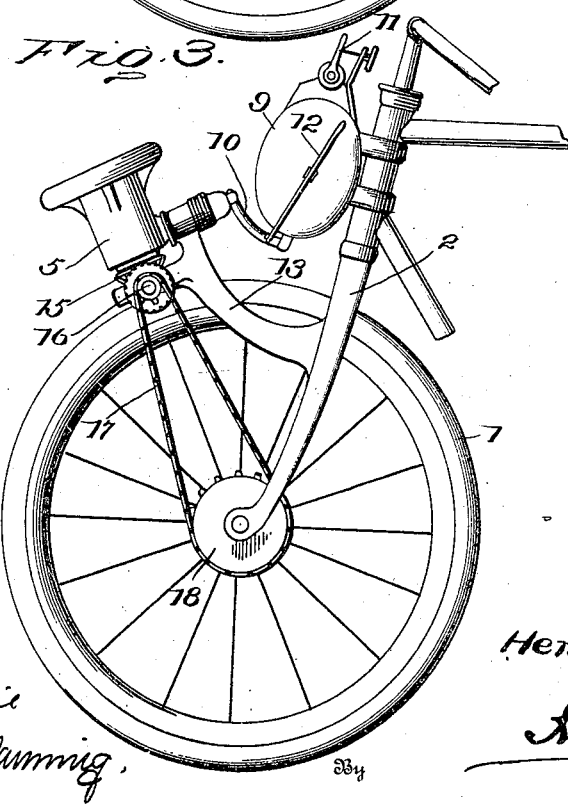
Witnesses
Inventor
Henry J. Lawson
By Knight Bros
Attorneys

UNITED STATES PATENT OFFICE.

HENRY JOHN LAWSON, OF LONDON, ENGLAND.

MOTOR DRIVING MECHANISM.

SPECIFICATION forming part of Letters Patent No. 670,179, dated March 19, 1901.

Application filed November 7, 1900. Serial No. 35,746. (No model.)

*To all whom it may concern:*

Be it known that I, HENRY JOHN LAWSON, a subject of the Queen of Great Britain, residing at No. 10 Holborn Viaduct, in the city of London, England, have invented certain new and useful Improvements in Motor Driving Mechanism, of which the following is a specification.

The object of my invention is to produce a new and advantageous arrangement of an actuating-motor with a propelling-wheel of a motor-vehicle; and my invention will be fully understood upon reference to the accompanying drawings, forming part of this specification, and in which—

Figure 1 is a perspective view of a motor-vehicle of the three-wheel type in which my invention is embodied. Figs. 2 and 3 are side elevations of one end of a vehicle, showing modified arrangements of the driving-motor in connection with the propelling-wheel.

The principal feature of my invention consists in arranging the driving-motor tangentially and peripherally to the propelling-wheel and to have a suitable driving connection extending from said motor at that point to the hub of the propelling-wheel.

According to the method employed in Fig. 1, a propelling-wheel 1 is mounted in a steering-fork 2, formed with supporting-arms 3 and bracing-arms 4, and has two motors 5 mounted at opposite ends of the horizontal diameter of the wheel 1 in a tangential or peripheral relation, driving relation between said motors of the wheel being established through the medium of radial shafts 6, rotated through gears 7 from the motors and driving the propelling-wheel through worm-gears 8. A carbureter and fuel-containing tank 9 is mounted upon the steering-head and supplies fuel through pipes 10 to the motors 5. The controlling handles or valves 11 12 for regulating the carbureting action and the supply of the carbureted fuel to the motors are mounted upon the carbureter and fuel-supply tank, all within convenient reach of the rider.

According to the forms illustrated in Figs. 2 and 3 the motors 5 are mounted above the propelling-wheel 1 and forward of the steering-fork 2, being supported in proper relation upon brackets 13 and supplied from the carbureter and fuel-supply tank 9 through pipes 10 in the same manner as described with reference to Fig. 1.

In Fig. 2 the power is transmitted through a gear 7 to a shaft 6 and from said shaft to the propelling-wheel through a bevel-gear 14. In Fig. 3, however, power is transmitted through bevel-gear 15 from the motor to a short shaft 16 and is transmitted from said shaft through a chain 17. The same forms of controlling valves and levers 11 12 are employed in Figs. 2 and 3 as in Fig. 1. In each of these forms, aside from simplicity of construction and special adaptation for the use of small power-motors, each motor is shown located within the steering action of the vehicle. The motor swings about and changes the enveloping atmosphere about it sufficiently to greatly assist in the cooling action of the explosive-motor at times when there is not sufficient relative motion between the travel of the vehicle and the atmospheric air—as, for instance, when the wind is in the same direction of travel.

All of these forms may be provided, in addition to the mechanism specifically described, with a common type of hand-brake clutch on the steering-wheel having controlling connection extending within reach of the rider on the steering-handle, so that the driving connection between the motor and the propelling-wheel, and consequently the speed of the vehicle may be regulated at will.

It will be observed that the carbureter and fuel-supply is built upon the steering member in such a manner that all of its regulating mechanism and connections move with the steering member, thus avoiding the use of joints or flexible connections.

Having thus described my invention, the following is what I claim as new therein and desire to secure by Letters Patent:

1. In a motor driving mechanism the combination of a propelling-wheel, and a motor peripherally disposed with relation to said wheel, having its axis substantially parallel to the plane of the wheel, and a shaft by which said motor is geared to the wheel.

2. In a motor driving mechanism the combination of a propelling-wheel, and a motor peripherally disposed with relation to the wheel, and with its axis substantially radial to the wheel and a driving-shaft substantially parallel to the plane of the wheel and extending to and geared to the hub of the wheel.

3. In a motor driving mechanism the combination of a steering-head, a propelling-wheel mounted in said steering-head, a motor, carried by the steering-head, peripherally disposed with relation to the wheel, with its axis substantially radial to the wheel and having driving connection with the hub of the wheel.

4. In a motor driving mechanism, the combination of a propelling-wheel, and a plurality of motors symmetrically disposed radially beyond the wheel and having motor-shafts axially parallel to the plane thereof and in driving relation therewith.

5. In a motor driving mechanism the combination of a propelling-wheel and a plurality of motors having shafts axially parallel to the plane of said wheel, symmetrically disposed with relation thereto and in balanced driving connection therewith.

6. In a motor driving mechanism, the combination of a propelling-wheel motor having its driving-axis disposed in the plane of the wheel, radially beyond the periphery thereof and a shaft driven by and laterally offset with relation to the driving-axis of the motor and in lateral driving connection with the propelling-wheel.

HENRY JOHN LAWSON.

Witnesses:
   THOS. T. SHERMAN,
   HERVEY S. KNIGHT.